Feb. 2, 1960
C. AMBLER ET AL
2,923,194
FILM SLITTING APPARATUS
Filed April 2, 1956
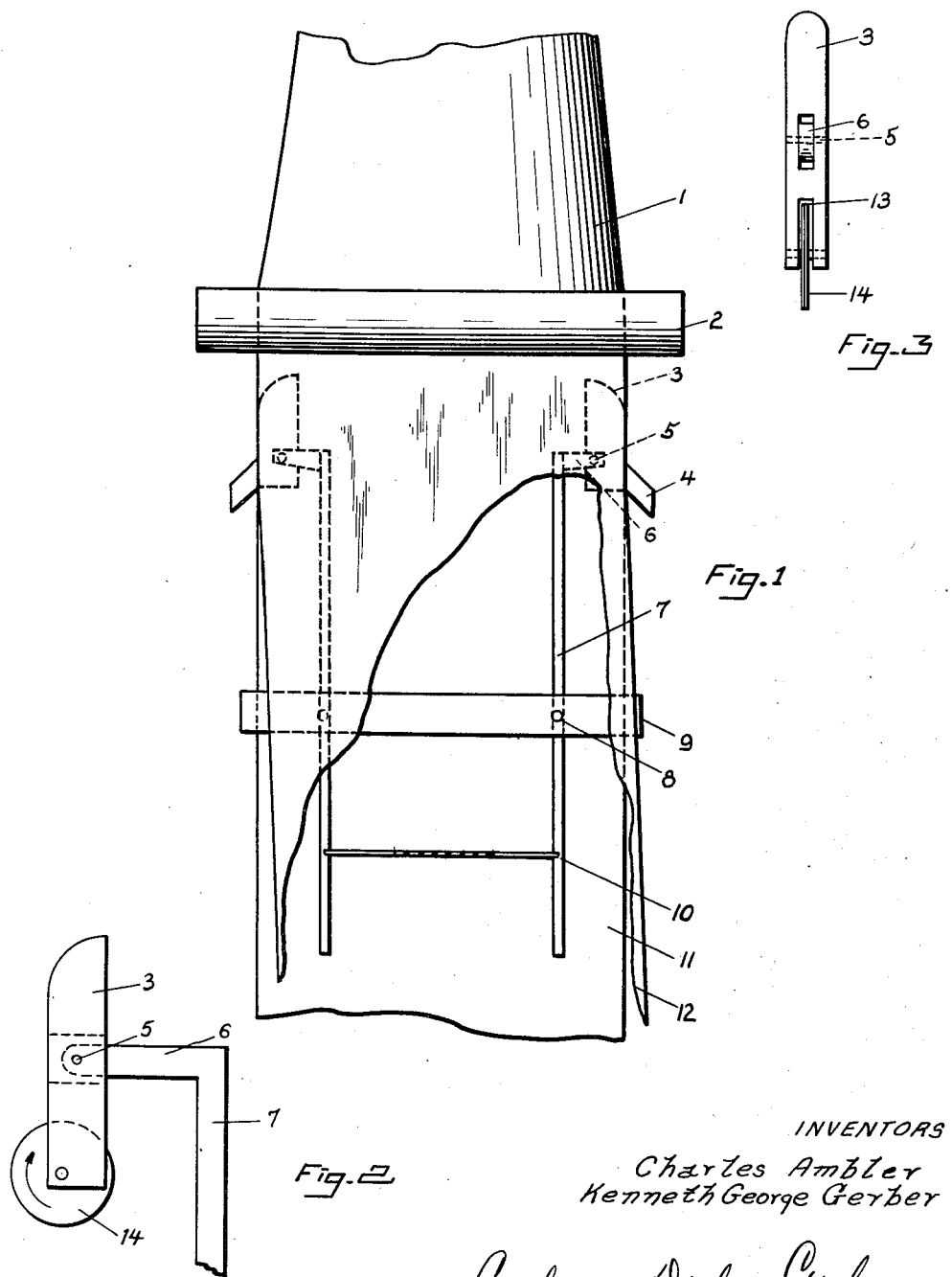
INVENTORS
Charles Ambler
Kenneth George Gerber
BY Cushman, Darby & Cushman
ATTORNEYS

United States Patent Office 2,923,194
Patented Feb. 2, 1960

2,923,194

FILM SLITTING APPARATUS

Charles Ambler, St. Albans, and Kenneth George Gerber, Welwyn Garden City, England, assignors to Imperial Chemical Industries Limited, London, England, a corporation of Great Britain Application April 2, 1956, Serial No. 575,488

Claims priority, application Great Britain April 22, 1955

7 Claims. (Cl. 83—176)

This invention relates to apparatus for longitudinally slitting tubular film.

Flat films of organic thermoplastic materials are frequently produced by extruding a film in tubular form, stretching it by enclosed fluid pressure to reduce its thickness and, if desired, to orient the film, and then flattening the film and slitting it along one or both folds to produce one or two lengths of flat film.

It is an object of the present invention to provide new apparatus by means of which tubular film may be slit in a particularly economical manner to form a single length of flat film or two lengths of flat film of substantially equal width.

Further objects and advantages of the invention will be in part obvious and in part pointed out hereinafter.

The novel features of the invention may be best made clear from the following description and accompanying drawings in which:

Figure 1 is a diagrammatic view of a film slitting apparatus of the invention.

Figure 2 is an end view of a modification of the guiding members shown in Figure 1.

Figure 3 is a view of the guiding member taken at a right angle to Figure 2 and in a horizontal direction.

In accordance with the present invention, a device for slitting a continuously advancing length of partially or wholly collapsed tubular film comprises two guiding members outwardly urged in opposite directions and adapted to operate inside said tubular film, each of said guiding members having at least a part of an outermost edge or surface adapted to be brought into and maintained in sliding contact with the line of the fold of the film and to follow any lateral movement thereof, and at least one of said guiding members carrying a film slitting member projecting beyond said outermost edge or surface of the guiding member and mounted operatively towards the oncoming film.

The apparatus is particularly useful for slitting collapsed tubular film along the lines of both of its folds, in which case a film slitting means is of course carried by each of the guiding members.

The guiding members are preferably flat elongated structures, and the edges that are in sliding contact with the film at the fold lines are preferably straight and continuous over the region of contact, but preferably curve inwardly at the ends towards the oncoming film. This curved arrangement prevents the film from being snagged by the edges of the guiding members, and ensures smoothness of adjustment of the separation and alignment of the guiding members and slitting members in accordance with any variations in the flat width of the film. Moreover, the slitting device may act as the final means for collapsing the film, which may be only partly collapsed as it approaches the slitting device, and the rounded edges of the guiding members will then assist in collapsing the film without tearing or snagging. It is preferred that other shape changing means be provided to reduce the film at least to a partially collapsed form.

One particular form of the apparatus of the present invention is illustrated diagrammatically in Figure 1 of the accompanying drawing, in which:

1 represents a continuously advancing inflated tubular film which is being gradually collapsed and flattened as it approaches a pair of nip rolls, 2. The completely flattened film emerges from the nip rolls and is internally contacted at each fold by one of the guiding members, 3, of the cutting device; each guiding member carries a knife, 4, which has its cutting edge directed towards the advancing film. Each guiding member is connected at 5 by a pivot to a member, 6, which is united by a fixed joint to a rod, 7. The two rods 7 are mounted by pivots, 8, upon the carrying bar 9 of the device, and the ends of the rods remote from the guiding members are urged towards each other by a stretched rubber strip or spring, 10. The outer edges of the guide members are thus pressed outwardly into the folds of the tubular film, which is continuously slit at each fold by the knives. The resulting lengths of flat film, 11 and 12, are separately drawn off by driven rollers, one length from each side of the plane of the cutting device.

The guiding members are preferably of metal, and may if desired be covered with a lubricant; for example, they may be rubbed or coated with polytetrafluoroethylene or with a silicone resin. The knives may be integral with the guiding members, but are preferably detachably mounted thereon or otherwise closely associated therewith so that they may easily be sharpened or replaced.

It will be appreciated that may modifications and variations may be made in the apparatus particularly described, especially in the shape of the guiding members and the method used for outwardly urging these members towards the fold of the film, and in the shape and method of operation of the knives. For example, the stretched rubber strip or spring, 10, may be replaced by a pair of stretched rubber strips or springs each attached at one end to one of the rods, 7, between the guide members 3 and the carrying member 9, and at the other end to a support spaced outwardly from the rod 7, so that the guiding members are urged towards the film. In another arrangement that replaces the rubber strip or spring, 10, a wire or string is attached to each rod, at or near the end remote from the knives, each wire or string is passed over a pulley or like device at or near the same end of the other rod, and a weight is suspended upon the free end of each of the wires or strings; these weights draw the ends of the rods, 7, towards each other and thus urge the guiding members against the film. Other modifications of the apparatus may be designed to allow a sharp cutting edge to be maintained on the knives. Thus, as seen in Figures 2 and 3, the guiding members may be slotted as at 13 to carry circular blades 14 capable of rotation, and these may be slightly turned by hand at intervals to present a new cutting edge to the oncoming film.

The apparatus of the present invention may be used for slitting films of any organic thermoplastic material that can be extruded and processed to give film in tubular form. Such materials include, for example: polythene; linear film-forming superpolyesters, such as polyethylene terephthalate; linear superpolyamides; certain vinyl polymers and copolymers such as polystyrene, polyvinyl chloride and vinyl chloride/vinylidene chloride copolymers; and cellulose derivatives such as cellulose acetate.

By the use of the slitting device of the present invention the film may be slit without waste since no edge-trimming is necessary, and the action of the guiding members prevents creasing of the film. Moreover, in the case of film which has been completely flattened, for example by nip rolls, so that permanent creases are formed, the device provides a means by which the slits can be made to follow the lines of these creases without wandering.

We claim:

1. A device for slitting a continuously advancing length of tubular film that has been partially or wholly collapsed towards a plane containing the axis of the film and intersecting the film at points diametrically opposite each other, said device comprising two guiding members, means for continuously urging said members outwardly in opposite directions so that they exert continuous pressure upon the inside surface of said tubular film, each of said guiding members having at least a part of an outermost edge or surface adapted to be brought into and maintained in sliding contact with the film along one of the lines of intersection of said plane and said film and to follow any lateral movement thereof, and at least one of said guiding members carrying a film slitting knife blade rearwardly of the forward end of said members and with its cutting edge projecting outwardly and rearwardly beyond said outermost edge or surface of the guiding member to slit the oncoming film.

2. A device as claimed in claim 1 in which the guiding members are flat, elongated structures each having in sliding contact with the film an edge that is straight and continuous over the region of contact but curves inwardly at its end facing the oncoming film.

3. A device as claimed in claim 1 comprising a bar member adapted to be held at right angles to the axis of an advancing length of tubular film and having attached thereto, by pivot joints spaced one from the other along the length of the bar member, a pair of elongated members each carrying at its end, through a pivot joint, one of the said guiding members, the point of attachment of each guiding member being at the same distance on each of said elongated members from the point of attachment of the latter to the bar member, and said means for continuously urging said guiding members outwardly acting through said elongated members.

4. A device as claimed in claim 3 in which the ends of said elongated members remote from the guiding members project beyond the bar member and are urged towards each other.

5. A device as claimed in claim 4 in which said guiding members are of metal.

6. A device as claimed in claim 4 in which the film slitting members are knives detachably mounted upon said guiding members.

7. A device as claimed in claim 4 in which each film slitting member is a circular knife carried by the guiding member, which is suitably slotted to receive it, the circular knife being capable of rotation.

References Cited in the file of this patent

UNITED STATES PATENTS

| | | |
|---|---|---|
| 495,257 | Moore | Apr. 11, 1893 |
| 1,607,427 | Boros | Nov. 16, 1926 |
| 1,665,213 | Lentz | Apr. 10, 1928 |
| 1,669,634 | Templeton | May 15, 1928 |
| 2,350,027 | Gardner | May 30, 1944 |
| 2,395,200 | Smiley | Feb. 19, 1946 |
| 2,566,639 | Shreve | Sept. 4, 1951 |